June 15, 1965          W. A. ZISMAN          3,189,802
VIBRATING CAPACITOR WITH A COATED REFERENCE ELECTRODE
Filed Nov. 29, 1960
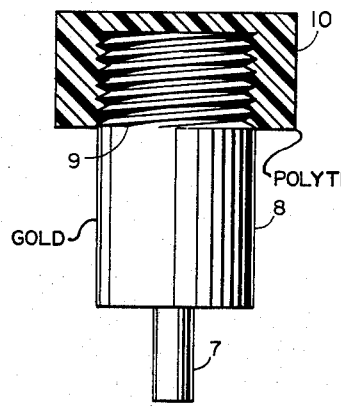
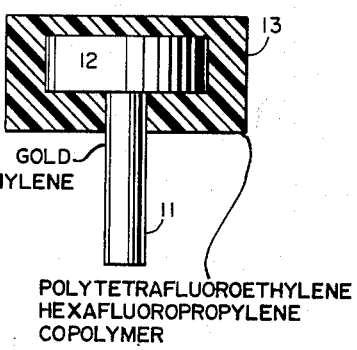
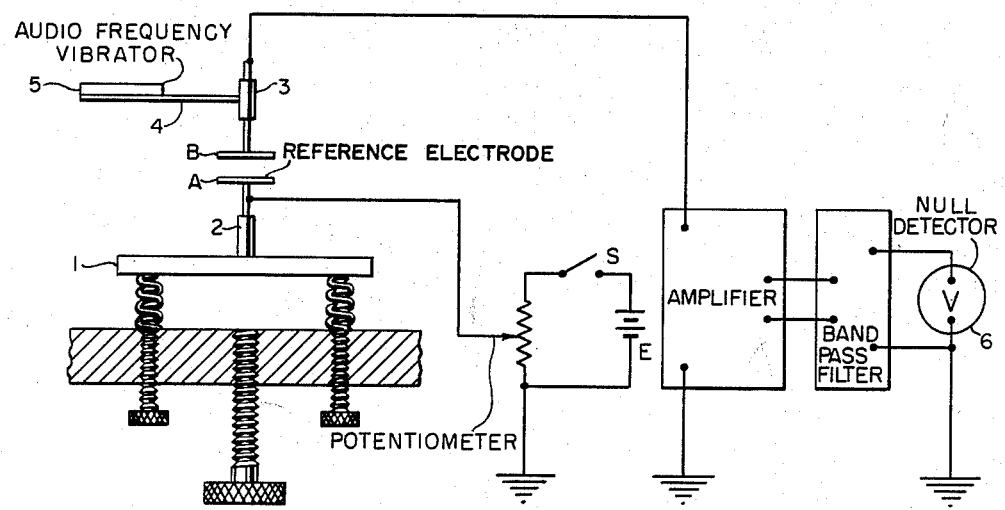
INVENTOR
WILLIAM A. ZISMAN
BY
ATTORNEYS

United States Patent Office

3,189,802
Patented June 15, 1965

3,189,802
VIBRATING CAPACITOR WITH A COATED
REFERENCE ELECTRODE
William A. Zisman, Silver Spring, Md., assignor to the
United States of America as represented by the Secretary of the Navy
Filed Nov. 29, 1960, Ser. No. 72,535
3 Claims. (Cl. 317—250)
(Granted under Title 35, U.S. Code (1952), sec. 266)

The invention described herein may be manufactured and used by or for the Government of the United States of America for governmental purposes without the payment of any royalties thereon or therefor.

This invention relates to an improved apparatus for the measurement of contact potential differences and to new reference electrodes for use therein.

The potential necessary to remove an electron from a metal is known as the work function of the metal. If two dissimilar metals be brought into a slightly spaced apart relationship, a difference in potential will exist between the opposed surfaces of the metals. This difference in potential expressed in terms of volts is known as the contact or Volta potential difference and corresponds to the difference between the work functions of the two metals.

The work function of a metal is changed by gas adsorption and surface chemical reactions. Contact potential difference measurements are therefore useful in studying adsorption, corrosion, catalysis and the effect of liquid films on metals. Particular applications for such measurements are the study of surface effects on semi-conductors, determination of the relative humidity of the atmosphere or of other gases and of the concentration of gaseous ions in the atmosphere, as a detector in gas chromatography, and indicating or warning of the presence of chemical warfare or other poisonous gases.

The most widely used method for contact potential difference measurement is one employing the voltage output of a variable capacity condenser. This method, which was first described in Review of Scientific Instruments 3, 367–70 (1932), involves bringing together the metal under study as one electrode and a reference metal as the other electrode to form a parallel plate-type condenser; vibrating the electrode of the metal under study at an audio frequency to vary the capacity of the condenser, measuring the charge or voltage output of the condenser, and applying a battery charge to the reference metal electrode which is equal and of opposite sign to the charge from the condenser to provide a null signal in the system. The contact potential difference for the metal under study is the applied battery potential but of opposite sign.

The reference electrode used in the variable condenser method should have a stable contact potential. This has been a difficult matter in view of the sensitivity of metal surfaces to adsorbed gases. Resort has been had to the use of one of the aged noble metals, especially platinum and gold, as a reference surface. However, the stability of such aged noble metal surfaces is only comparative and in some atmospheres their surface potentials may suddenly change by several hundred millivolts or more. Adsorbed water vapor is one of the major causes of such adverse effects.

It is an object of this invention to provide an apparatus for conducting the measurement of contact potential differences by the variable condenser method with a reference electrode of improved stability. It is also an object to provide a new reference electrode of improved stability to surface potential change.

The above and other objects are accomplished in the new reference electrodes of my invention and improved apparatus provided with the same which are illustrated in the accompanying drawing and more fully set forth in the following description.

I have found that an improved reference electrode of remarkable stability to change in surface potential can be had by covering the face or working surface of the electrode with a thin solid layer of a fully fluorinated hydrocarbon polymer, for example, Teflon which is polytetrafluoroethylene and FEP Teflon which is a copolymer of tetrafluoroethylene and hexafluoropropylene in which the polymeric components may be present in various ratios. Copolymers of tetrafluoroethylene and hexafluoropropylene are described in U.S. Patent 2,549,935 to Sauer, granted April 24, 1951, U.S. Patent 2,598,283 to Miller, granted May 27, 1952, in U.S. Patent 2,938,889 to Krespan, granted May 31, 1960, and in U.S. Patent 2,946,763 to Bro and Sandt, granted July 26, 1960, and by Bernett and Zisman in the Journal of Physical Chemistry, 64, 1292–94 (September 1960). Reference electrodes so modified in accordance with my invention will present to the ambient atmosphere, a polymer surface of low surface energy and have by consequence but feeble adsorptivity for water vapor and a wide variety of gases and organic vapors. The polymer surface will also be chemically inert to such gases and vapors.

The thickness of the solid polymer layer covering the face or working surface of the reference electrodes of the invention may vary from a minimum sufficient to provide a continuous film over the face to greater magnitudes which do not prevent arrangement of the metal faces or working surfaces of the electrode pair in close proximity in the condenser whereby to obtain a signal of adequate strength. A suitable range of thickness for the thin solid polymer covering on the face of the reference electrodes is of the order of from about 5 to 30 mils. A spacing or gap of the order of 1 to 2 mils between the electrodes in the condenser, measured from the polymer covering on the face of the reference electrode, will generally suffice to give a signal of adequate strength in operation of the condenser.

Various metals may be used for the reference electrodes of the invention, for example, any of the noble metals and metals such as copper, nickel, brass, aluminum, chromium, cold-rolled steel, etc. Preferably, the metal for the reference electrodes is a noble or other corrosion-resistant metal or metal alloy. Particularly well-suited as metals for the reference electrodes are gold, platinum, platinum-iridium alloys and rhodium.

In the drawing:

FIG. 1 is a view, partly in section and in exaggerated dimensions, of a reference electrode in accordance with my invention.

FIG. 2 is a view, partly in section and in exaggerated dimensions, of a modified form of a reference electrode in accordance with my invention, and FIG. 3 is a schematic showing of an improved apparatus for the measurement of contact potential differences equipped with a reference electrode of my invention.

Referring to FIG. 1, the reference electrode there shown is of the type in which the face or surface of the metal electrode is covered with a thin solid layer of Teflon. The electrode as shown is a rod of circular cross-section, made of gold or platinum, and has a stem 7 and a head 8 of enlarged diameter which is screw-threaded as shown at the face or working surface end 9. The diameter of the electrode at the working surface is not critical, but is chosen of small order as a practical matter. The stem 7 may be of any practical length allowing mounting of the electrode in the measuring apparatus.

Covering the face or working surface of the electrode with Teflon is accomplished by the use of a preformed cap 10 of sintered Teflon which is screw-threaded interiorly to engage the threading of the head 8 of the electrode for tightly encasing the head and face of the electrode, as shown. Teflon powder is difficult to mold and for this reason, threaded caps were machined from sintered Teflon rod stock. The threaded joint between the metal electrode and the Teflon cap can be made an effective seal against penetration by gases or vapors to the enclosed surface of the electrode by careful machining of the electrode and the cap. As an expedient for protecting against penetration of gases or vapors to the electrode surface, a sealant, such as a varnish, may be applied at the outer juncture of the cap and the electrode. The base of the cap 10 functions as the thin polymer layer which overlies the working surface or face 9 of the electrode. The sidewall of the Teflon cap may be of any suitable thickness which enables handling and application of the cap to the metal electrode.

In FIG. 2, the reference electrode is of T-configuration and circular in cross-section. The metal of the electrode is gold, in accordance with a preferred selection in regard to metal for the electrodes. The stem 11 is integral with the head 12 which is of a diameter of the order of one centimeter. The stem 11 may be of any practical length allowing mounting and electrical connection in the measuring apparatus. The head 12 is coated with fused FEP Teflon. Where it overlies the face of the head, the coating is preferably of the order of 5 mils in thickness. On the other portions of the head, the coating may be thicker and of any practical thickness. A preferred FEP Teflon for the coating is that formerly known in the trade as 100X–FEP Teflon and presently sold as FEP Fluorinated Resin.

Application of the FEP Teflon to the metal electrode may be made following a known technique by dipping the head of the electrode heated to about 310° C. into an air-fluidized mass of the FEP Teflon powder. The powder-coated electrode is then heated at about 310° C. until fusion of the powder takes place which is evidenced by a wet, glistening aspect of the coating. The coating solidifies on cooling in air. By repeated dipping of the coated electrode into the fluidized mass of FEP Teflon powder, fusing, and cooling to solidify the coating, the thickness of the coating may be built up to the desired magnitude. Adhesion of the fused coating to disc-type electrodes can be enhanced by providing a plurality of small diameter holes through the metal of the disc before application of the FEP Teflon powder thereto. FEP Teflon is preferred as the material for covering of the electrode surface because of the ease of the mode of applying same. It is also preferred because of a lower critical surface tension of wetting than Teflon.

FIG. 3 is a schematic showing of an apparatus for carrying out the variable condenser method for measurement of contact potential differences in which the new reference electrodes of the invention can be used with application of their advantages. Aside from the new reference electrode, the apparatus shown is of conventional construction and arrangement. The new reference electrode is shown at A and forms the stationary plate of the vibrating condenser. The metal under study is shown at B forming the movable plate of the condenser.

The new reference electrode A is mounted in position on the apparatus as the stationary, lower plate of the vibrating condenser by means of an adjustable support, indicated generally at 1. The adjustable support, as shown, is of conventional construction and comprises a main platform on which is carried a leveling platform which is spring-supported and provided with leveling screws. The stem of the reference electrode A is seated in a holder 2 with a portion of it projecting above the holder for electrical connection thereto. The holder 2 is mounted on the leveling platform and both are made of an electrical insulating material which may be Bakelite or polyethylene, etc.

The electrode B of the metal under study is mounted in position to form the movable, upper plate of the vibrating condenser. This can be accomplished by insertion of the stem of the electrode through a metal sleeve 3 and holding it therein by means of set screws. The stem extends a suitable distance above the holder 3 to provide for electrical connection thereto.

A metal rod 4 is attached at one end to the sleeve 3 in an electrically insulated manner for transmission of vibratory motion at audio frequencies to the sleeve 3 and the electrode B therein. The other end of the rod 4 is attached to means for imparting vibration to the rod at audio frequencies, shown in conventionalized fashion at 5. Suitable audio frequency vibrators are loud speakers, or power driven tuning forks having a fundamental frequency in the audio range. The metal rod 4 may be attached to the metal frame about the diaphragm of the speaker, or directly to the tuning fork.

The electrode B of the metal under study is electrically connected in series with an amplifier, a band pass filter and a null detector 6 which may be an A.C. voltmeter, as shown, or other type of null indicator. The reference electrode A of the invention is electrically connected to an external battery circuit containing a potentiometer in series with battery E which is arranged to deliver a charge to the condenser plates which is of opposite sign to the charge resulting from vibrating the electrode B in operation of the measuring apparatus. A switch S is provided for closing the battery circuit.

The improved apparatus of the invention shown in FIG. 3 equipped with a new reference electrode A is operated in known way for the measurement of contact potential differences by the vibrating condenser method. The electrodes A and B are adjusted to be parallel to each other at the selected spacing, suitably a 1–2 mil gap, and the electrode B set in vibration by means of the audio frequency vibrator 5 at a selected frequency, for example, at 200 or 500 c.p.s. The charge or contact potential difference developed between the plates A and B of the vibrating condenser flows to the amplifier and the amplified potential to the band pass filter where unwanted frequencies are removed, leaving essentially a single frequency potential, the magnitude of which is indicated at the alternating current voltmeter 6. To obtain the contact potential difference between the metal of the electrode B and of the reference electrode A, the switch S in the battery circuit is closed and by adjustment of the potentiometer, a charge equal in magnitude to that indicated by the voltmeter 6, but of opposite sign, is sent from the battery E to the reference electrode A to effect a null in the system. The contact potential difference between the metal of the electrode B and of the reference electrode A is that of the magnitude of the battery potential required to effect a null in the system, but of opposite sign.

The vibrating condenser may be replaced in the above-described measuring apparatus with a variable capacity condenser in which the movable electrode B is a disc of dielectric material having a plurality of radially arranged segments of the metal under study mounted on one face thereof and facing the working surface of the reference electrode A in parallelism and close proximity thereto. The dielectric material of which the disc is made may be Bakelite, polyethylene, etc. Suitable driving means is provided for rotation of the disc. Rotational movement of the disc electrode over the reference electrode A will set up an alternating current by virtue of the registering and non-registering of the metal segments on the disc with the metal face or working surface of the reference electrode A.

In the use of the fully fluorinated hydrocarbon polymer covered reference electrodes of the invention for contact potential difference measurements, the precaution is taken of removing excess electrostatic charges from the polymer covered surface prior to use. This may be done by irradiating the atmosphere near the polymer surface with alpha particles from a weak radioactive source, such as a polonium foil or a plated radium foil. The gaseous ions generated diffuse to the metal face of the electrode and neutralize any trapped electrostatic charges which may have accumulated there in handling or rubbing of the polymer surface.

While in the above description the invention has been described with reference to certain specific embodiments thereof, it is to be understood that such are to be taken by way of illustration rather than in limitation on the scope of the invention except as may be defined in the appended claims.

What is claimed is:

1. An apparatus for the measurement of contact potential differences between two metals which comprises in combination:

means for holding a plate electrode in stationary position, a plate electrode of a reference metal in said holding means, said reference metal electrode having the face thereof covered with a thin continuous layer of a fully fluorinated hydrocarbon polymer of low surface energy, means for holding a plate electrode of a second metal for vibratory movement at audio frequencies in closely spaced parallel relationship to said stationary reference electrode, and means for imparting vibratory movement at audio frequencies to said holding means for the electrode of the second metal.

2. An apparatus as defined in claim 1, wherein the fully fluorinated hydrocarbon polymer of the thin continuous covering layer on the face of the reference metal electrode is a tetrafluoroethylene-hexafluoropropylene copolymer.

3. An apparatus as defined in claim 2, wherein the metal of the face of the stationary reference electrode is a noble metal.

References Cited by the Examiner

UNITED STATES PATENTS

| | | | |
|---|---|---|---|
| 1,471,547 | 10/23 | Chilowsky et al. | |
| 1,975,801 | 10/34 | Rieber. | |
| 2,366,844 | 1/45 | Doschek | 324—32 |
| 2,406,492 | 8/46 | Dorsman | 324—98 |
| 2,477,688 | 8/49 | Dyer | 317—249 |
| 2,532,010 | 11/50 | Courvoisier | 324—32 X |
| 2,549,935 | 4/51 | Sauer | 260—87.5 |
| 2,588,513 | 3/52 | Giacoletto | 320—1 X |
| 2,658,173 | 11/53 | Resse | 317—250 |
| 2,669,665 | 2/54 | Annis et al. | 324—32 |
| 2,785,219 | 3/57 | Rudner | 174—166 |
| 2,825,872 | 3/58 | Stubbs et al. | 324—72.5 X |
| 2,918,521 | 12/59 | Abrams | 174—166 |

OTHER REFERENCES

Zisman, W. A.: Review of Scientific Instruments (Q 184.R5), vol. 3, No. 7, July 1932, pp. 367–370.

LARAMIE E. ASKIN, *Primary Examiner*.

LLOYD McCOLLUM, FREDERICK M. STRADER, E. JAMES SAX, JOHN F. BURNS, *Examiners*.